United States Patent
Er et al.

(10) Patent No.: US 10,318,179 B1
(45) Date of Patent: Jun. 11, 2019

(54) HOST DEVICE TO EMBEDDED MULTI-MEDIA CARD DEVICE COMMUNICATION

(71) Applicants: NXP B.V., Eindhoven (NL); NXP USA, Inc., Austin, TX (US)

(72) Inventors: Bin Er, Beijing (CN); Wenwei Jiang, Beijing (CN); Xiaodong Niu, Shanghai (CN); Yan Song, Shanghai (CN)

(73) Assignee: NXP B.V., San Jose, CA (US)

( * ) Notice: Subject to any disclaimer, the term of this patent is extended or adjusted under 35 U.S.C. 154(b) by 0 days.

(21) Appl. No.: 15/922,929

(22) Filed: Mar. 16, 2018

(30) Foreign Application Priority Data

Dec. 27, 2017 (CN) .......................... 2017 1 14338484

(51) Int. Cl.
  *G06F 3/06* (2006.01)
  *G06F 13/42* (2006.01)

(52) U.S. Cl.
  CPC ............ *G06F 3/0613* (2013.01); *G06F 3/067* (2013.01); *G06F 3/0659* (2013.01); *G06F 13/4282* (2013.01)

(58) Field of Classification Search
  CPC ............. G06F 13/40; G06F 13/4282; G06F 15/17331; G06F 13/00; G06F 13/4291
  USPC ......... 710/74, 104, 106, 313, 8, 105, 110, 2, 710/305
  See application file for complete search history.

(56) References Cited

U.S. PATENT DOCUMENTS

| | | | | |
|---|---|---|---|---|
| 2004/0117553 A1* | 6/2004 | Kurakata | ............... | G06K 19/07 711/115 |
| 2005/0235069 A1* | 10/2005 | Miwa | .................. | G06F 13/4072 710/8 |
| 2008/0186992 A1* | 8/2008 | Kondapalli | ........... | H04L 49/351 370/419 |
| 2008/0235411 A1* | 9/2008 | Zhang | ................. | G06F 13/4291 710/28 |
| 2010/0088441 A1* | 4/2010 | Peterson | ................. | B60L 1/003 710/110 |
| 2011/0074372 A1* | 3/2011 | Yu | ...................... | H05B 33/0809 323/282 |
| 2011/0238866 A1* | 9/2011 | Zitlaw | ................... | G06F 13/161 710/5 |
| 2012/0072628 A1* | 3/2012 | Crockett | ............. | G06F 13/4291 710/110 |
| 2014/0019644 A1* | 1/2014 | Decesaris | ........... | G06F 13/4291 710/5 |

(Continued)

OTHER PUBLICATIONS

"SDIO Emulation Over SPI Without SPI Mode in SDHC Master", IPCOM Prior Art Database, Jul. 22, 2010, pp. 1-6, IPCOM000197935D, http://priorartdatabase.com/IPCOM/000197935.

(Continued)

*Primary Examiner* — Faisal M Zaman
(74) *Attorney, Agent, or Firm* — Charles E. Bergere

(57) ABSTRACT

A host device includes a first serial peripheral interface (SPI) and a second SPI to communicate with an embedded multimedia card (eMMC) device. The host device has a mode controller that controls the first SPI to toggle between first transmission and first reception modes for command transmission and response reception, respectively. The mode controller controls the second SPI to toggle between second transmission and second reception modes for data transmission and data reception, respectively.

23 Claims, 4 Drawing Sheets

(56) References Cited

U.S. PATENT DOCUMENTS

| | | | | |
|---|---|---|---|---|
| 2014/0082267 A1* | 3/2014 | Yoo | ................... | G06F 3/0656 |
| | | | | 711/103 |
| 2014/0115222 A1* | 4/2014 | DeCesaris | ........... | G06F 13/4291 |
| | | | | 710/313 |
| 2015/0378960 A1* | 12/2015 | Huffman | ............. | G06F 13/4045 |
| | | | | 710/300 |
| 2017/0103027 A1* | 4/2017 | Olmstead | .............. | G06F 13/102 |
| 2018/0267920 A1* | 9/2018 | Lin | ..................... | G06F 13/4068 |
| 2018/0276157 A1* | 9/2018 | Lofamia | ............... | G06F 13/364 |

OTHER PUBLICATIONS

"RX63N and RX631 Group of MCUs 1-bit SD-mode SDIO Driver Software Library", Version V1.01, Renesas, Sep. 30, 2014.
JESD84-B51, https://www.jedec.org/document_search?search_api_views_fulltext=jesd84-b51.

* cited by examiner

HOST DEVICE TO EMBEDDED MULTI-MEDIA CARD DEVICE COMMUNICATION

BACKGROUND

The present invention relates generally to electronic circuits, and more particularly, to a host device that communicates with an embedded multi-media card (eMMC) device.

Portable electronic devices, such as portable computers, cell phones, digital cameras, wearable devices, and the like, generally include an embedded multi-media card (eMMC) device for data storage. Such eMMC devices are embedded within the corresponding portable electronic device, and include a flash memory for storing data. The portable electronic devices further include an embedded host device that performs various memory access operations on the eMMC device.

FIG. 1 shows an example of a conventional host device in communication with an eMMC device. More particularly, FIG. 1 shows an integrated circuit (IC) 100 including a conventional host device 102 in communication with an eMMC device 104. The IC 100 is embedded within an electronic device (not shown), such as one of the devices listed above. The host device 102 may comprise a microprocessor, a microcontroller, an application specific integrated circuit (ASIC) processor, a central processing unit (CPU), and the like. The host device 102 includes a host controller 106 that enables the host device 102 to communicate with the eMMC device 104 by way of a communication interface 108. The communication interface 108 includes a bidirectional command channel 108A, a unidirectional clock channel 108B, and a bidirectional data bus 108C including eight data channels.

The host device 102 is connected between a supply voltage VCC and ground GND. The host controller 106 is a dedicated peripheral of the host device 102 that has dedicated pins (not shown) for communication with the eMMC device 104.

The eMMC device 104 is connected between the supply voltage VCC and ground GND. The eMMC device 104 includes an eMMC device controller 110 and a memory array 112. The eMMC device controller 110 is a dedicated peripheral that enables the eMMC device 104 to communicate with the host device 102 by way of the communication interface 108. The eMMC device controller 110 has dedicated pins (not shown) for communicating with the host device 102. The eMMC device 104 further includes a reset terminal RST for receiving a reset signal. The memory array 112 is a flash memory that stores data.

The host device 102 transmits various commands to the eMMC device 104 for performing various memory access operations, by way of the host controller 106 and the bidirectional command channel 108A. Examples of the commands include data-read, data-write, data-erase, format eMMC, and the like. The host device 102 further transmits a clock signal to the eMMC device 104 by way of the host controller 106 and the unidirectional clock channel 108B. The clock signal synchronizes the eMMC device 104 with the host device 102.

The eMMC device 104 transmits a response to each command received from the host device 102 by way of the eMMC device controller 110 and the bidirectional command channel 108A. Based on the response, the host device 102 performs the corresponding memory access operation on the eMMC device 104. For example, based on the response to the data-write command, the host device 102 transmits write-data to the eMMC device 104, and based on the response to the data-read command, the host device 102 receives read-data from the eMMC device 104.

As portable devices become smaller, it would be advantageous to be able to reduce the size of the host device.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
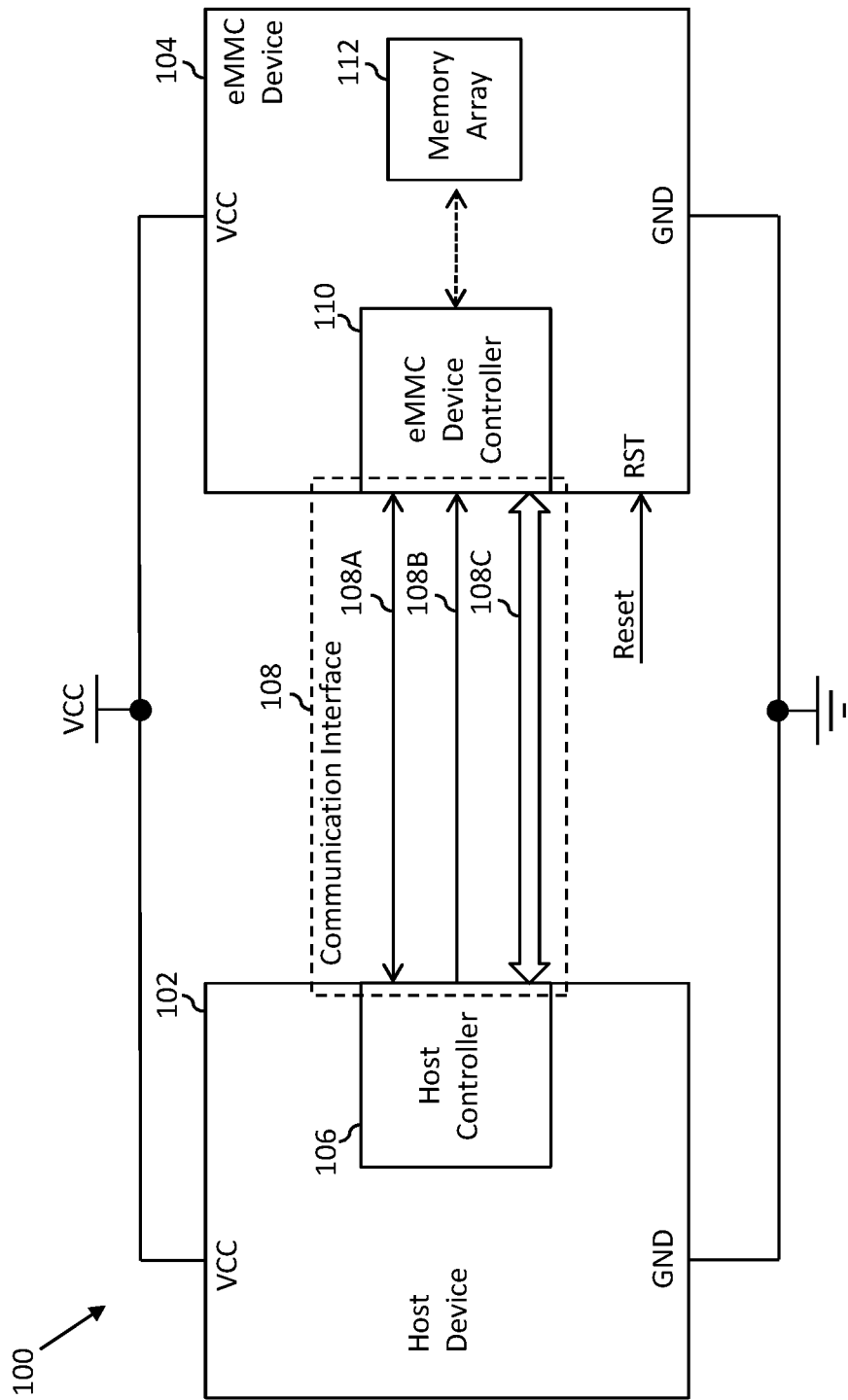
FIG. 1 is a schematic block diagram of a conventional integrated circuit including a host device in communication with an eMMC device.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In one embodiment, the present invention provides a host device in communication with an embedded multimedia card (eMMC) device. The host device includes a first serial peripheral interface (SPI), a second SPI, and a mode controller. The first SPI has a command output terminal connected to a first terminal of the eMMC device and transmits at least one of a data-write command and a data-read command. The first SPI also has a response input terminal connected to the first terminal for receiving a response to at least one of the data-write command and the data-read command. The first SPI is operable in first transmission and first reception modes. The second SPI has a data output terminal connected to a second terminal of the eMMC device for transmitting write-data, based on the data-write command. The second SPI also has a data input terminal connected to the second terminal for receiving read-data, based on the data-read command. The second SPI is operable in second transmission and second reception modes. The mode controller enables the first SPI to operate in the first transmission and first reception modes, and the second SPI to operate in the second transmission and second reception modes, based on one of the data-write command and the data-read command.

In another embodiment, the present invention provides a host device in communication with an eMMC device, where the host device includes a first and second SPI, first and second control registers, and a mode controller. The first SPI has a command output terminal connected to a first terminal of the eMMC device for transmitting at least one of a data-write command and a data-read command. The first SPI also has a response input terminal connected to the first terminal for receiving a response to the data-write command and the data-read commands. The first SPI is operable in one of first transmission and first reception modes. The second SPI has a data output terminal connected to a second terminal of the eMMC device for transmitting write-data based on the data-write command. The second SPI also has a data input terminal connected to the second terminal for receiving read-data, based on the data-read command. The second SPI is operable in second transmission and second reception modes. The first control register has a first reserved bit for enabling the first SPI to operate in one of the first transmission and first reception modes. The second control register has a second reserved bit for enabling the second SPI to operate in one of the second transmission and second reception modes. The mode controller controls a value of the first reserved bit based on at least one of the data-write command and the data-read command, thereby enabling the first SPI to operate in one of the first transmission and first reception modes. The mode controller further sets a value of the second reserved bit based on at least one of the data-write command and the data-read command, which enables the second SPI to operate in one of the second transmission and second reception modes.

In yet another embodiment, the present invention provides an integrated circuit comprising a host device in communication with an eMMC device. The host device includes first and second SPI, and a mode controller. The first SPI has a command output terminal connected to a first terminal of the eMMC device for transmitting at least one of a data-write command and a data-read command. The first SPI transmits the data-write command to execute a data-write operation on the eMMC device and the data-read command to execute a data-read operation on the eMMC device. The first SPI further has a response input terminal connected to the first terminal for receiving responses to the data-write and data-read commands. The first SPI is operable in one of first transmission and first reception modes. The second SPI has a data output terminal connected to a second terminal of the eMMC device for transmitting write-data, based on the data-write command. The second SPI further has a data input terminal connected to the second terminal for receiving read-data, based on the data-read command. The second SPI is operable in one of second transmission and second reception modes. The mode controller enables the first SPI to operate in one of the first transmission and first reception modes, and the second SPI to operate in one of the second transmission and second reception modes, based on at least one of the data-write command and the data-read command.

Various embodiments of the present invention provide a host device in communication with an eMMC device. The host device and the eMMC device are included on an IC. The host device includes a first SPI, a second SPI, and a mode controller. The first SPI has command output and response input terminals that are connected to a first terminal of the eMMC device for command and response transfer. The first SPI is operable in one of first transmission and first reception modes. At a time instance, one of the command output and response input terminals is active. When the first SPI is in the first transmission mode, the command output terminal is active and transmits at least one of a data-write command and a data-read command to the eMMC device. When the first SPI is in the first reception mode, the response input terminal is active and receives a response to at least one of the data-write command and the data-read command from the eMMC device. The second SPI has data output and data input terminals that are connected to a second terminal of the eMMC device for data transfer. The second SPI is operable in second transmission and second reception modes. At a time instance, one of the data output and data input terminals is active. When the second SPI is in the second transmission mode, the data output terminal is active and transmits write-data to the eMMC device. When the second SPI is in the second reception mode, the data input terminal is active and receives read-data from the eMMC device. The mode controller enables the first SPI to operate in one of the first transmission and first reception modes, and the second SPI to operate in one of the second transmission and second reception modes, based on at least one of the data-write command and the data-read command.

The use of first and second SPIs to communicate with the eMMC device eliminates the need for the host device to have a dedicated host controller, which in turn reduces the circuit and package size of the host device. The reduced size of the host device is beneficial to meet size constraints of portable electronic devices.

Figure 2:
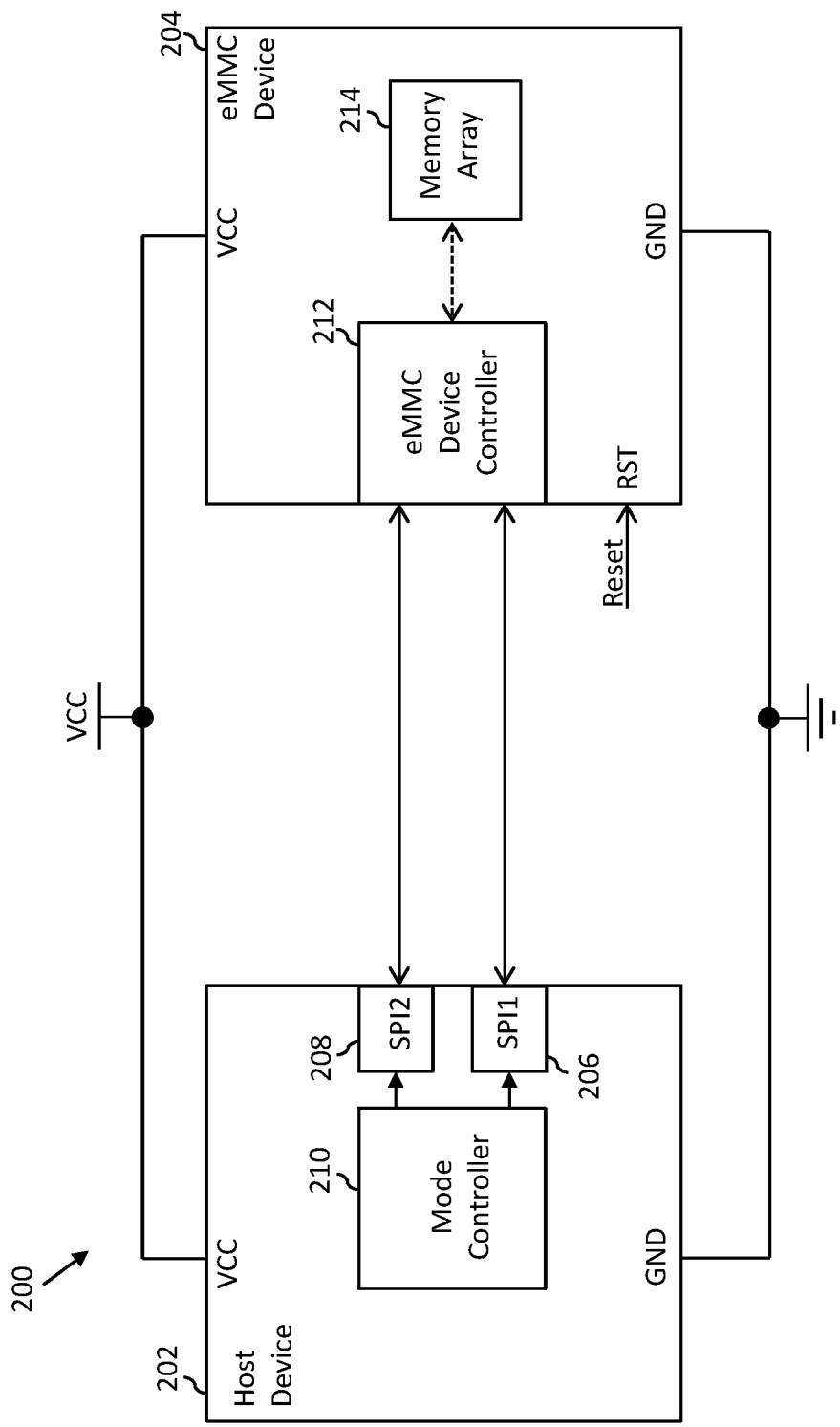
FIG. 2 is a schematic block diagram of an integrated circuit including a host device in communication with an eMMC device in accordance with an embodiment of the present invention.

Referring now to FIG. 2, a schematic block diagram of an integrated circuit 200 including a host device 202 in communication with an embedded multi-media card (eMMC) device 204, in accordance with an embodiment of the present invention, is shown. In one embodiment, the integrated circuit 200 is embedded within an electronic device (not shown), such as a portable computer, cell phone, digital camera, laptop, tablet, portable navigation device, wearable device, etc.

The host device 202 is connected between a supply voltage VCC and ground GND. The host device 202 is a data processing device that performs various memory access operations on the eMMC device 204, such as read, write, format, and erase operations. Examples of the host device 202 include a microprocessor, a microcontroller, an application specific integrated circuit (ASIC) processor, a central processing unit (CPU), and the like. The host device 202 includes a first serial peripheral interface (SPI) 206, a second SPI 208, and a mode controller 210. The host device 202 is connected to the eMMC device 204 by way of the first and second SPIs 206 and 208.

The first and second SPIs 206 and 208 enable the host device 202 to communicate with the eMMC device 204. The first and second SPIs 206 and 208 are synchronous serial communication interfaces that enable the host device 202 to transfer commands, data, control signals, clock signals, power signals, and the like, to the eMMC device 204.

The first SPI 206 is operable in one of first transmission and first reception modes. When the host device 202 wants to transmit a command to the eMMC device 204, the first SPI 206 is enabled to operate in the first transmission mode. When the host device 202 wants to receive a response to the command from the eMMC device 204, the first SPI 206 is enabled to operate in the first reception mode.

The second SPI 208 is operable in one of second transmission and second reception modes. When the host device 202 wants to transmit data to the eMMC device 204, based on the command, the second SPI 208 is enabled to operate in the second transmission mode. When the host device 202 wants to receive data from the eMMC device 204, based on the command, the second SPI 208 is enabled to operate in the second reception mode.

The mode controller 210 is a control circuit that enables the first SPI 206 to operate and toggle between the first transmission and first reception modes, based on the command to be transmitted to the eMMC device 204. The mode controller 210 also enables the second SPI 208 to operate and toggle between the second transmission and second reception modes, again based on the command. In one embodiment, the mode controller 210 is implemented as a set of instructions stored in a main memory (not shown) of the host device 202. In another embodiment, the mode controller 210 is implemented using a dedicated hardware circuit, such as a microcontroller, an ASIC processor, and the like, embedded within the host device 202. The first and second SPIs 206 and 208 in conjunction with the mode controller 210 form an eMMC host controller for the host device 202 for communicating with the eMMC device 204.

The eMMC device 204 is an on-chip memory device. The eMMC device 204 is connected between the supply voltage VCC and ground GND, and includes an eMMC device controller 212 and a memory array 214. The eMMC device 204 also includes a reset terminal RST for receiving a reset signal.

The eMMC device controller 212 is a dedicated peripheral of the eMMC device 204 that enables the eMMC device 204 to communicate with the host device 202. The eMMC device controller 212 has dedicated terminals (shown in FIG. 3) for communicating with the host device 202. In one embodiment, the eMMC device controller 212 also includes a central processing unit (CPU, not shown) for facilitating data storage management.

The memory array 214 is a flash memory that stores the data received from the host device 202. The memory array 214 further stores a response to each command received from the host device 202. In one embodiment, based on a command received from the host device 202, the eMMC device controller 212 retrieves data and the corresponding response from the memory array 214. The eMMC device controller 212 further transmits the retrieved response and data to the host device 202. The memory array 214 also is used to store information related to the eMMC device 204, such as manufacturer information, version information, serial number information, and the like. The operation of the host device 202 and the eMMC device 204 are explained in detail below in conjunction with FIG. 3.

Figure 3:
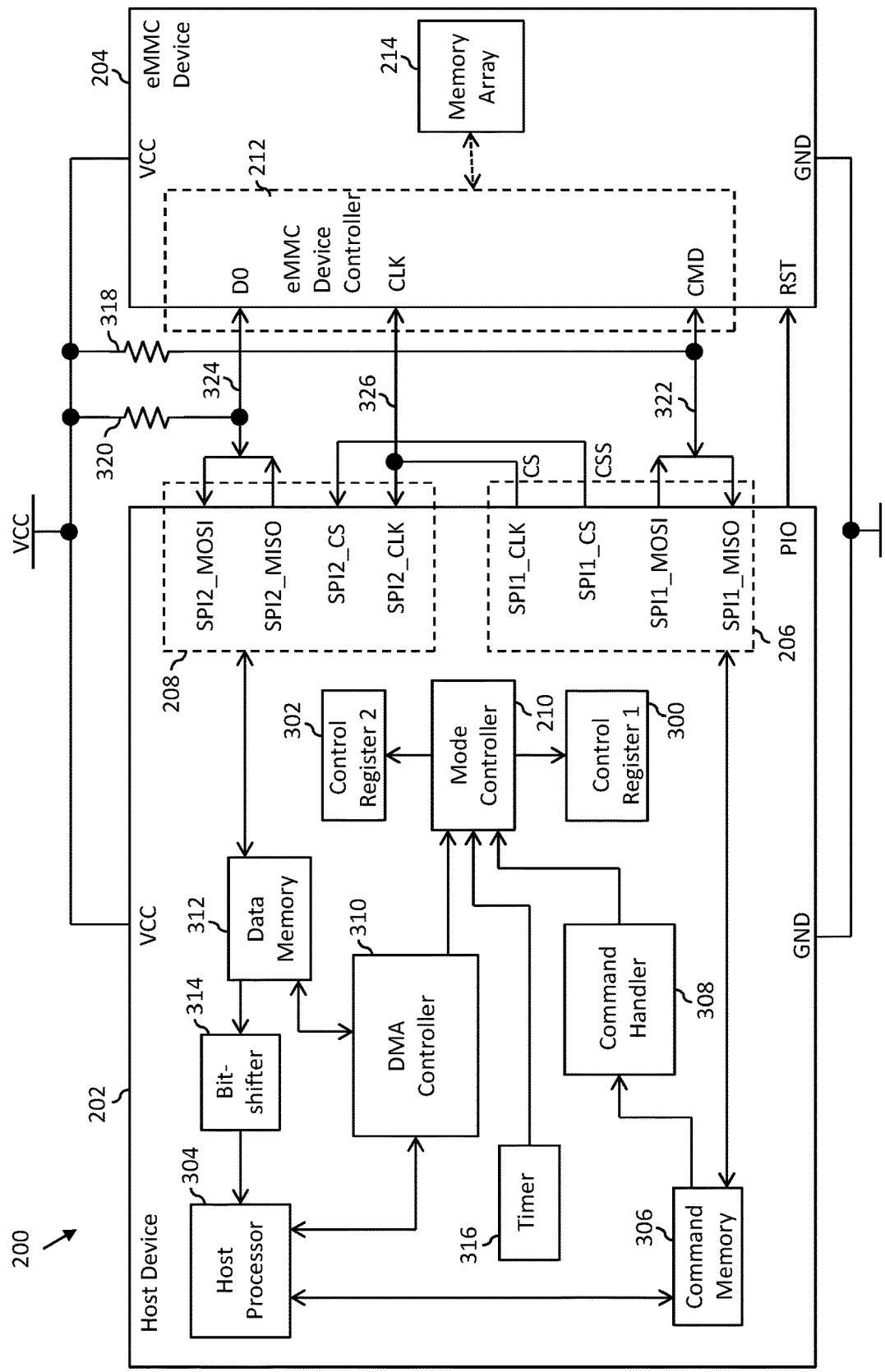
FIG. 3 is a detailed schematic block diagram of the integrated circuit of FIG. 2 in accordance with an embodiment of the present invention.

FIG. 3 is a detailed schematic block diagram of the integrated circuit 200 in accordance with an embodiment of the present invention. In this embodiment, the host device 202 includes first and second control registers 300 and 302, a host processor 304, a command memory 306, a command handler 308, a direct memory access (DMA) controller 310, a data memory 312, a bit-shifter 314, and a timer 316. In one embodiment, the host device 202 also includes a secure digital multimedia card (SDMMC) interface installed in the main memory of the host device 202 as a software module, where the SDMMC interface enables the host device 202 for communications with the eMMC device 204. The host device 202 further includes an input/output terminal PIO. The IC 200 includes first and second resistors 318 and 320. The eMMC device 204 includes the eMMC device controller 212 and the memory array 214. The eMMC device controller 212 includes a command terminal CMD, a data terminal D0, and an eMMC clock terminal CLK.

The first SPI 206 includes a command output terminal SPI1_MOSI, a response input terminal SPI1_MISO, a first clock terminal SPI1_CLK, and a first chip-select terminal SPI1_CS. The command output terminal SPI1_MOSI is connected to the command terminal CMD by way of a command channel 322. The response input terminal SPI1_MISO is connected to the command output terminal SPI1_MOSI. The response input terminal SPI1_MISO is further connected to the command terminal CMD by way of the command channel 322.

The host device 202 transmits various commands to the eMMC device 204 via the command channel 322 by using the command output terminal SPI1_MOSI. Examples of the commands include data-read, data-write, data-erase, format eMMC command, and the like. The host device 202 receives responses to the commands from the eMMC device 204 via the command channel 322 by way of the response input terminal SPI1_MISO.

At one time instance, one of the command output terminal SPI1_MOSI and the response input terminal SPI1_MISO is active. When the command output terminal SPI1_MOSI is active and the response input terminal SPI1_MISO is inactive, the first SPI 206 operates in the first transmission mode. When the response input terminal SPI1_MISO is active and the command output terminal SPI1_MOSI is inactive, the first SPI 206 operates in the first reception mode. Hence, the host device 202 implements a half-duplex command and response transfer by way of the first SPI 206. The first SPI 206 is operable in one of the first transmission and first reception modes by way of the first control register 300. The activation and deactivation of the command output terminal SPI1_MOSI and the response input terminal SPI1_MISO, using the first control register 300 eliminates any output conflict in the command channel 322.

The second SPI 208 includes a data output terminal SPI2_MISO, a data input terminal SPI2_MOSI, a second clock terminal SPI2_CLK, and a second chip-select terminal SPI2_CS. The data output terminal SPI2_MISO is connected to the data terminal D0 by way of a data channel 324. The data input terminal SPI2_MOSI is connected to the data output terminal SPI2_MISO. The data input terminal SPI2_MOSI is further connected to the data terminal D0 by way of the data channel 324.

To perform the data-write operation on the eMMC device 204, based on the data-write command, the host device 202 transmits write-data to the eMMC device 204 via the data channel 324 using the data output terminal SPI2_MISO. To perform the data-read operation on the eMMC device 204, based on the data-read command, the host device 202 receives read-data from the eMMC device 204 via the data channel 324 using the data input terminal SPI2_MOSI.

At one time instance, one of the data output terminal SPI2_MISO and the data input terminal SPI2_MOSI is active. When the data output terminal SPI2_MISO is active and the data input terminal SPI2_MOSI is inactive, the second SPI 208 operates in the second transmission mode. When the data input terminal SPI2_MOSI is active and the data output terminal SPI2_MISO is inactive, the second SPI 208 operates in the second reception mode. Hence, the host device 202 implements a half-duplex data transfer by way of the second SPI 208. The second SPI 208 is operable in the second transmission and second reception modes depending on a value stored in the second control register 302. Thus, the activation and deactivation of the data output terminal SPI2_MISO and the data input terminal SPI2_MOSI, using the second control register 302, eliminates any output conflict in the data channel 324.

The first chip-select terminal SPI1_CS is connected to the second chip-select terminal SPI2_CS. In one embodiment, the first SPI 206 generates a chip-select signal CSS. The first chip-select terminal SPI1_CS transmits the chip-select signal CSS to the second chip-select terminal SPI2_CS, thereby enabling the first SPI 206 to operate as a master SPI. Thus, the second SPI 208 that receives the chip-select signal CSS serves as a slave SPI. When the chip-select signal CSS is active, the second SPI 208 is enabled. Conversely, when the chip-select signal CSS is inactive, the second SPI 208 is disabled.

The first clock terminal SPI1_CLK is connected to the second clock terminal SPI2_CLK for synchronizing command and data transfer performed by the host device 202. When the first SPI 206 is the master SPI, the first SPI 206 generates and provides a clock signal CS to the second SPI 208 that is serving as the slave SPI. The first clock terminal SPI1_CLK provides the clock signal CS to the second clock terminal SPI2_CLK. The first clock terminal SPI1_CLK is further connected to the eMMC clock terminal CLK of the eMMC device controller 212 by way of a clock channel 326. The first clock terminal SPI1_CLK further transmits the clock signal CS to the eMMC clock terminal CLK by way of the clock channel 326, to synchronize the eMMC device 204 with the host device 202. The I/O terminal PIO is connected to the reset terminal RST of the eMMC device 204. The input/output terminal PIO generates and transmits the reset signal to the reset terminal RST to reset the eMMC device 204.

The first control register 300 is a first n-bit register (for example, n=8) having a first reserved bit. The first reserved bit is used to control operations of the first SPI 206. Based on a value of the first reserved bit, the first SPI 206 is enabled to operate in one of the first transmission and first reception modes. In one embodiment, when the first reserved bit is set (i.e., '1'), the first SPI 206 operates in the first transmission mode, and when the first reserved bit is '0', the first SPI 206 operates in the first reception mode. In another embodiment, when the first reserved bit is '0', the first SPI 206 operates in the first transmission mode, and when the first reserved bit is '1', the first SPI 206 operates in the first reception mode. In one embodiment, the first control register 300 is implemented using an input/output control (IOCON) register. In another embodiment, the first control register 300 is implemented using a first n-bit variable (for example, n=8) having the first reserved bit.

The second control register 302 is a second n-bit register (for example, n=8) having a second reserved bit. The second reserved bit is used to control operations of the second SPI 208. Based on a value of the second reserved bit, the second SPI 208 will operate in one of the second transmission and second reception modes. In one embodiment, when the second reserved bit is set, the second SPI 208 operates in the second transmission mode, and when the second reserved bit is clear, the second SPI 208 operates in the second reception mode. In another embodiment, when the second reserved bit is clear, the second SPI 208 operates in the second transmission mode, and when the second reserved bit is set, the second SPI 208 operates in the second reception mode. In one embodiment, the second control register 302 is implemented using an IOCON register. In another embodiment, the second control register 302 is implemented using a second n-bit variable (for example, n=8) having the second reserved bit. It will be understood by those of skill in the art that the first and second control registers 300 and 302 may be formed using just one register and/or memory location.

The host processor 304 generates commands to perform corresponding memory access operations on the eMMC device 204. The host processor 304 provides the commands to the command memory 306 and the DMA controller 310. Examples of the host processor 304 include an ARM core processor, a digital signal processor (DSP), and the like.

The command memory 306 is connected to the host processor 304 for receiving the commands generated by the host processor 304. In one embodiment, the command memory 306 is implemented as a first-in-first-out (FIFO) memory buffer in a static random access memory (SRAM). The command memory 306 stores the commands received from the host processor 304 in a queue. The command memory 306 further provides the commands to the first SPI 206 and the command handler 308. The command memory 306 receives responses to the commands from the eMMC device 204 by way of the first SPI 206. The command memory 306 stores and provides the responses received from the eMMC device 204 to the host processor 304 and the command handler 308. In one embodiment, the command memory 306 comprises a first shift register (not shown) that transmits each command to the first SPI 206 in a serial format.

The command handler 308 receives the commands and the responses from the command memory 306, and transfers the received commands and responses to the mode controller 210. In one embodiment, the command handler 308 is implemented as a set of instructions stored in the main memory of the host device 202. In another embodiment, the command handler 308 is implemented by way of a dedicated hardware circuit embedded within the host device 202.

The DMA controller 310 is connected to the host processor 304 and the data memory 312. The DMA controller 310 receives the data-read and data-write commands from the host processor 304, and controls execution of the data-read and data-write operations on the eMMC device 204. The DMA controller 310 generates and transmits first and second interrupt signals to the host processor 304 to indicate completion of the data-read and data-write operations. The DMA controller 310 further communicates the first and second interrupt signals to the mode controller 210. In one embodiment, the host device 202 includes a co-processor, such an ARM processor, cortex-M0+ processor, and the like, instead of the DMA controller 310 to control the execution of the data-read and data-write operations.

The data memory 312 is connected to the DMA controller 310 and the second SPI 208. In one embodiment, the data memory 312 is a FIFO memory buffer in a SRAM. The data memory 312 stores the write-data received from the DMA controller 310, and provides the write-data to the second SPI 208 to be transmitted to the eMMC device 204. In one embodiment, the data memory 312 comprises a second shift register (not shown) that transmits the write-data to the second SPI 208 in a serial format. The data memory 312 stores the read-data received from the eMMC device 204 by way of the second SPI 208. In one embodiment, the data memory 312 provides the read-data to the DMA controller 310 and the bit-shifter 314.

The bit-shifter 314 provides the read-data to the host processor 304. In one embodiment, the bit-shifter 314 is a serial-in-parallel-out shift register that transmits the read-data to the host processor 304 in a parallel format. In another embodiment, the bit-shifter 314 is a serial-in-serial-out shift register that transmits the read-data to the host processor 304 in a serial format.

The mode controller 210 receives the commands and responses from the command handler 308, and the first and second interrupt signals from the DMA controller 310. The mode controller 210 enables the first SPI 206 to toggle between the first transmission and first reception modes by controlling the value of the first reserved bit, based on the commands. The mode controller 210 further enables the second SPI 208 to toggle between the second transmission and second reception modes by controlling the value of the second reserved bit, based on the commands.

The timer 316 generates a third interrupt signal to reset the mode controller 210 when the timer 316 times out. When the mode controller 210 does not receive a response to a command within a predetermined time limit, the timer 316 times out and generates the third interrupt signal, thereby resetting the mode controller 210. The timer 216 may comprise a watchdog timer, a multi-rate timer, and the like. The first and second resistors 318 and 320 act as fail-safe resistors for preventing an open circuit condition of the command and data channels 322 and 324, respectively.

In operation, the supply voltage VCC powers the host device 202 and the eMMC device 204. The SDMMC interface initializes the eMMC device 204, and the mode controller 210 becomes operational when the eMMC device 204 is initialized. To perform a memory access operation, such as the data-write operation, on the eMMC device 204, the host processor 304 generates the data-write command. The data-write command includes a memory address of the main memory from which the write-data is to be fetched. The data-write command also includes information of data size of the write-data. The host processor 304 provides the data-write command to the command memory 306. The command memory 306 stores and queues the data-write command. Based on the clock signal CS, the command memory 306 provides the data-write command to the command handler 308 and the first SPI 206. In one embodiment, the command memory 306 provides the data-write command to the command handler 308 and the first SPI 206 at a rising edge of the clock signal CS. The command handler 308 also provides the data-write command to the mode controller 210.

When the mode controller 210 receives the data-write command from the command handler 308, the mode controller 210 sets the first reserved bit to '1'. Based on the value of the first reserved bit '1', the command output terminal SPI1_MOSI is activated and the response input terminal SPI1_MISO is deactivated. Thus, the mode controller 210 modifies the value of the first reserved bit to enable the first SPI 206 to operate in the first transmission mode.

The command output terminal SPI1_MOSI transmits the data-write command to the command terminal CMD by way of the command channel 322. In one embodiment, the data-write command is a multi-bit command. Hence, the command output terminal SPI1_MOSI transmits the data-write command bit-by-bit to the command terminal CMD, based on the clock signal CS. Hence, the clock signal CS synchronizes the data-write operation. The command output terminal SPI1_MOSI may require a first predetermined number of clock cycles of the clock signal CS to transmit the data-write command to the eMMC device 204. For example, if the data-write command is a 16-bit data-write command, then the command output terminal SPI1_MOSI requires 16 clock cycles of the clock signal CS to transmit the data-write command to the eMMC device 204.

The mode controller 210 then waits for the first predetermined number of clock cycles and changes the value of the first reserved bit to '0'. For example, for the 16-bit data-write command, the mode controller 210 waits 16 clock cycles before changing the value of the first reserved bit to '0'. Based on the value of the first reserved bit '0', the command output terminal SPI1_MOSI is deactivated and the response input terminal SPI1_MISO is activated. Thus, the mode controller 210 modifies the value of the first reserved bit to enable the first SPI 206 to operate in the first reception mode after the first predetermined number clock cycles have elapsed. The command terminal CMD of the eMMC device 204 receives the data-write command from the command output terminal SPI1_MOSI. The eMMC device controller 212 then processes the data-write command and fetches a corresponding response to the data-write command from the memory array 214. In one embodiment, the response may indicate that the eMMC device 204 is ready for the data-write operation. In another embodiment, the response may indicate that the eMMC device 204 is not ready for the data-write operation due to one or more operational issues. An example of an operational issue is unavailability of memory space in the memory array 214.

The command terminal CMD transmits the response to the response input terminal SPI1_MISO, which is now active, by way of the command channel 322. The response input terminal SPI1_MISO transmits the response to the command memory 306. The command memory 306 stores and provides the response to the host processor 304 and the command handler 308.

The command handler 308 provides the response to the mode controller 210. Based on the response to the data-write command, the mode controller 210 changes the value of the first reserved bit back to '1' to enable the first transmission mode of the first SPI 206. Thus, the command output terminal SPI1_MOSI is activated to transmit a next command, queued in the command memory 306, to the eMMC device 204. Further, when the response to the data-write command indicates that the eMMC device 204 is ready for the data-write operation, the mode controller 210 changes the value of the second reserved bit to '1'. Based on the value of the second reserved bit, the data output terminal SPI2_MISO is activated and the data input terminal SPI2_MOSI is deactivated. Thus, the mode controller 210 modifies the value of the second reserved bit to enable the second SPI 208 to operate in the second transmission mode when the eMMC device 204 is ready for the data-write operation.

In one embodiment, when the mode controller 210 does not receive the response after the first predetermined number clock cycles have elapsed, the timer 316 times out and generates the third interrupt signal. The mode controller 210 resets based on the third interrupt signal and receives a new command from the command handler 308. Thus, the timer 316 prevents the mode controller 210 from waiting for the response after the first predetermined number of clock cycles have elapsed. The third interrupt signal is a hardware driver interrupt signal.

The host processor 304 processes the response received from the eMMC device 204. In one embodiment, when the response indicates that the eMMC device 204 is ready for the data-write operation, the host processor 304 provides the data-write command to the DMA controller 310. The DMA controller 310 then controls the write-data transfer between the host device 202 and the eMMC device 204. In another embodiment, when the response indicates that the eMMC device 204 is not ready for the data-write operation, the host processor 304 generates a new command to resolve the one or more operational issues. It will be apparent to those skilled in the art that the host device 202 transmits the new command to the eMMC device 204 by performing similar steps used for transmitting the data-write command.

The DMA controller 310 receives the data-write command from the host processor 304. Based on the memory address included in the data-write command, the DMA controller 310 accesses the main memory and fetches the write-data from the memory address. The DMA controller 310 further stores the write-data in the data memory 312. The write-data also is transmitted to the second SPI 208.

The data output terminal SPI2_MISO, which is now active, transmits the write-data to the data terminal D0 by way of the data channel 324. In one embodiment, the write-data is multi-bit data. Hence, the data output terminal SPI2_MISO transmits the write-data bit-by-bit to the data terminal D0, based on the clock signal CS. The data output terminal SPI2_MISO may require a second predetermined number of clock cycles of the clock signal CS to transmit the write-data to the eMMC device 204. The data terminal D0 receives the write-data from the data output terminal SPI2_MISO. The eMMC device controller 212 then stores the write-data in the memory array 214.

When the second predetermined number of clock cycles elapse and the data-write operation is complete, the DMA controller 310 generates and transmits the first interrupt signal to the host processor 304, and to the mode controller 210. When the mode controller 210 receives the first interrupt signal from the DMA controller 310, the mode controller 210 changes the value of the second reserved bit, based on the next command received from the command handler 308.

To perform another memory access operation, such as a data-read operation, the host processor 304 generates the data-read command. In one embodiment, the data-read command includes a memory address of the memory array 214 from which the read-data is to be read. The data-read command further includes information of data size of the read-data. The host device 202 transmits the data-read command to the eMMC device 204 by performing similar steps used for transmitting the data-write command as described above.

When the response to the data-read command indicates that the eMMC device 204 is ready for the data-read operation, the mode controller 210 changes the value of the second reserved bit to '0'. Based on the value of the second reserved bit, the data output terminal SPI2_MISO is deactivated and the data input terminal SPI2_MOSI is activated. In other words, the mode controller 210 modifies the value of the second reserved bit to enable the second SPI 208 to operate in the second reception mode when the eMMC device 204 is ready for the data-read operation.

The host processor 304 provides the data-read command to the DMA controller 310. The DMA controller 310 then controls the read-data transfer between the host device 202 and the eMMC device 204. The data input terminal SPI2_MOSI, which is now active, receives the read-data from the data terminal D0 by way of the data channel 324. In one embodiment, the read-data is multi-bit data. Hence, the data input terminal SPI2_MOSI receives the read-data bit-by-bit from the data terminal D0, based on the clock signal CS. The data input terminal SPI2_MOSI may require a third predetermined number of clock cycles of the clock signal CS to receive the read-data from the eMMC device 204. Hence, the clock signal CS synchronizes the data-read operation. The data input terminal SPI2_MOSI receives the read-data from the data terminal D0. The data input terminal SPI2_MOSI provides the read-data to the data memory 312.

When the third predetermined number of clock cycles elapse and the data-read operation is complete, the DMA controller 310 generates and transmits the second interrupt signal to the host processor 304, and to the mode controller 210. When the mode controller 210 receives the second interrupt signal from the DMA controller 310, the mode controller 210 changes the value of the second reserved bit, based on the next command received from the command handler 308.

In one embodiment, the DMA controller 310 receives the read-data from the data memory 312 and accesses the main memory for storing the read-data. In another embodiment, the data memory 312 transmits the read-data to the bit-shifter 314, which in turn transmits the read-data to the host processor 304. In one embodiment, the bit-shifter 314 processes the read-data to execute various user applications installed in the main memory of the host device 202.

In one embodiment, when the eMMC device 204 is initialized, the host device 202 transmits an initialization command to retrieve the information of the eMMC device 204 stored in eMMC registers (not shown) embedded within the eMMC device 204. In one embodiment, the eMMC registers are included in the memory array 214. The information may include manufacturer information, version information, serial number information, and the like, of the eMMC device 204. In one embodiment, when the host device 202 transmits operational commands, which do not require data transmission and reception by way of the second SPI 208 to the eMMC device 204, the mode controller 210 only controls the first SPI 206. The host device 202 transmits the initialization command and the operational commands to the eMMC device 204 by performing similar steps used for transmitting the data-read and data-write commands.

It will be understood by a person having ordinary skill in the art that the scope of the host device 202 is not limited to having two separate control registers, i.e., the first and second control registers 300 and 302. In another embodiment, the host device 202 may have only one control register (i.e., the first control register 300 or the second control register 302) having two reserved bits (i.e., the first and second reserved bits) for controlling the operations of the first and second SPIs 206 and 208, respectively. Thus, the mode controller 210 enables the first SPI 206 to operate in the first transmission and first reception modes, and the second SPI 208 to operate in the second transmission and second reception modes, by way of the first and second reserved bits of the first control register 300, respectively.

Figure 4:
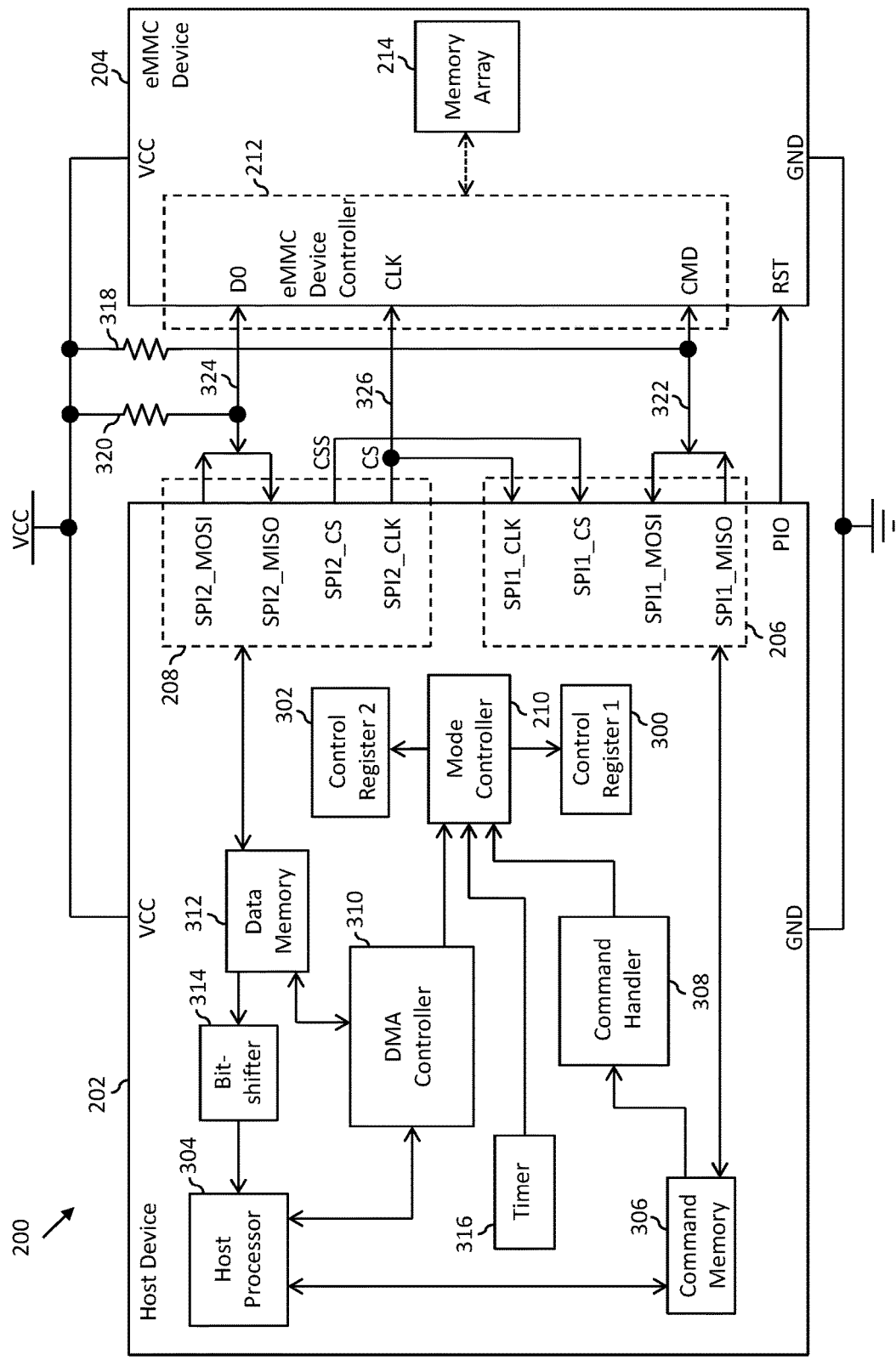
FIG. 4 is a detailed schematic block diagram of the integrated circuit of FIG. 2 in accordance with another embodiment of the present invention.

Referring now to FIG. 4, a detailed schematic block diagram of the integrated circuit 200, in accordance with another embodiment of the present invention, is shown. The second SPI 208 generates the chip-select signal CSS. The second chip-select terminal SPI2_CS transmits the chip-select signal CSS to the first chip-select terminal SPI1_CS, thereby enabling the second SPI 208 to operate as the master SPI. Thus, the first SPI 206 that receives the chip-select signal CSS serves as the slave SPI. When the chip-select signal CSS is active, the first SPI 206 is enabled. Conversely, when the chip-select signal CSS is inactive, the first SPI 206 is disabled.

When the second SPI 208 is the master SPI, the second SPI 208 generates and provides the clock signal CS to the first SPI 206, which is serving as the slave SPI. The second clock terminal SPI2_CLK provides the clock signal CS to the first clock terminal SPI1_CLK. The second clock terminal SPI2_CLK further transmits the clock signal CS to the eMMC clock terminal CLK, by way of the clock channel 326, for synchronizing the eMMC device 204 with the host device 202.

It will be understood by a person having ordinary skill in the art that when the second SPI 208 is the master SPI, the terminals SPI2_MOSI and SPI2_MISO serve as the data output and data input terminals, respectively. Further, when the first SPI 206 is the slave SPI, the terminals SPI1_MISO and SPI1_MOSI serve as the command output and response input terminals, respectively. The host device 202 executes the command and data transfer to the eMMC device 204 as explained in FIG. 3.

Since the host device 202 communicates with the eMMC device 204 using the first and second SPIs 206 and 208, the need for a dedicated host controller is eliminated. Hence, the host device 202 requires less space and has a small package size compared to conventional host devices that include dedicated host controllers. The small package size of the host device 202 enables the host device 202 for use in portable electronic devices that have end-product size constraints. The use of the command and data memories 306 and 312 resolves any data access timing jitter issues as the first and second SPIs 206 and 208 do not require interaction with the main memory of the host device 202. Hence, the operational speed of the host device 202 is improved compared to conventional host devices. Since the host processor 304 and the DMA controller 310 are capable of communicating with the first and second SPIs 206 and 208, respectively, the host device 202 achieves high data transfer rates than conventional host devices.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A host device that communicates with an embedded multimedia card (eMMC) device, the host device comprising:
   a first serial peripheral interface (SPI) that has a command output terminal SPI1_MOSI connected to a command terminal CMD of the eMMC device for transmitting at least one of a data-write command to execute a data-write operation on the eMMC device and a data-read command to execute a data-read operation on the eMMC device, a response input terminal SPI1_MISO connected to the command terminal CMD for receiving a response to the at least one of the data-write command and the data-read command, a first clock terminal SPI1_CLK, and a first chip-select terminal SPI1_CS, wherein the first SPI is operable in one of first transmission and first reception modes;
   a second SPI that has a data output terminal SPI2_MISO connected to a data terminal D0 of the eMMC device for transmitting write-data to the eMMC device based on the data-write command, a data input terminal SPI2_MOSI connected to the data terminal D0 for receiving read-data from the eMMC device based on the data-read command, a second clock terminal SPI2_CLK, and a second chip-select terminal SPI2_CS, wherein the second SPI is operable in one of second transmission and second reception modes;
   a mode controller, connected to the first and second SPIs, that enables the first SPI to operate in the first transmission mode and the first reception mode, and the second SPI to operate in the second transmission mode and the second reception mode, based on the data-read and data-write commands; and
   first and second resistors that act as fail-safe resistors for preventing an open circuit condition of the command and data channels.

2. The host device of claim 1, further comprising:
   a host processor that provides the data-read and data-write commands to the eMMC device by way of the command output terminal SPI1_MOSI of the first SPI, and receives the responses to the data-read and data-write commands from the eMMC device by way of the response input terminal SPI1_MISO of the first SPI.

3. The host device of claim 2, further comprising:
   a command memory that stores at least one of the data-write command and the data-read command, and provides the response to the one of the data-write command and the data-read command;
   a data memory for storing the write-data and the read-data;
   a command handler that receives the data-read and data-write commands, and the responses to the data-read and data-write commands from the command memory, and provides the data-read and data-write commands, and the responses thereto to the mode controller; and
   a timer that generates a third interrupt signal to reset the mode controller, and when the mode controller does not receive a response to a command within a predetermined time limit, the timer times out and generates the third interrupt signal, thereby resetting the mode controller.

4. The host device of claim 3, further comprising a bit-shifter that receives the read-data from the data memory and provides the read-data to the host processor, wherein the bit-shifter is one of a serial-in-parallel-out shift register and a serial-in-serial-out shift register.

5. The host device of claim 2, further comprising:
   a direct memory access (DMA) controller connected to the host processor for executing the data-read and data-write operations based on the data-read and data-write commands, respectively, by way of the second SPI, wherein the DMA controller generates and transmits an interrupt signal to the host processor and the mode controller to indicate a completion of the data-read and data-write operations executed by the second SPI.

6. The host device of claim 1, further comprising:
   a first control register having a first reserved bit for enabling the first SPI to operate in one of the first transmission and first reception modes, wherein the mode controller sets a value of the first reserved bit based on the data-read and data-write commands, thereby enabling the first SPI to operate in one of the first transmission and first reception modes; and
   a second control register having a second reserved bit for enabling the second SPI to operate in the second transmission and second reception modes, wherein the mode controller sets a value of the second reserved bit based on the data-read and data-write commands, thereby enabling the second SPI to operate in one of the second transmission and second reception modes.

7. The host device of claim 1, further comprising a first control register having a first reserved bit for enabling the first SPI to operate in the first transmission and first reception modes, and a second reserved bit for enabling the second SPI to operate in the second transmission and second reception modes, wherein:
   the mode controller sets a value of the first reserved bit based on the data-read and data-write commands, thereby enabling the first SPI to operate in one of the first transmission and first reception modes; and
   the mode controller sets a value of the second reserved bit based on the data-read and data-write commands, thereby enabling the second SPI to operate in one of the second transmission and second reception modes.

8. The host device of claim 1, wherein:
the command output terminal SPI1_MOSI is active and the response input terminal SPI1_MISO is inactive when the first SPI is in the first transmission mode, and
the command output terminal SPI1_MOSI is inactive and the response input terminal SPI1_MISO is active when the first SPI is in the first reception mode.

9. The host device of claim 1, wherein:
the data output terminal SPI2_MISO is active and the data input terminal SPI2_MOSI is inactive when the second SPI is in the second transmission mode, and
the data output terminal SPI2_MISO is inactive and the data input terminal SPI2_MOSI is active when the second SPI is in the second reception mode.

10. The host device of claim 1, wherein the second SPI generates and transmits a clock signal to the first SPI and the eMMC device for synchronizing the data-read and data-write operations.

11. The host device of claim 1, wherein the first SPI generates and transmits a clock signal to the second SPI and the eMMC device for synchronizing the data-read and data-write operations.

12. A host device for communication with an embedded multimedia card (eMMC) device, the host device comprising:
a first serial peripheral interface (SPI) having a command output terminal SPI1_MOSI connected to a first terminal of the eMMC device for transmitting at least one of a data-write command to execute a data-write operation on the eMMC device and a data-read command to execute a data-read operation on the eMMC device, and a response input terminal SPI1_MISO connected to the first terminal of the eMMC device for receiving a response to the at least one of the data-write command and the data-read command, wherein the first SPI is operable in one of a first transmission mode and a first reception mode;
a second SPI having a data output terminal SPI2_MISO connected to a second terminal of the eMMC device for transmitting write-data based on the data-write command to the eMMC device, and a data input terminal SPI2_MOSI connected to the second terminal of the eMMC device for receiving read-data from the eMMC device, based on the data-read command, wherein the second SPI is operable in one of a second transmission mode and a second reception mode;
a first control register having a first reserved bit for enabling the first SPI to operate in one of the first transmission mode and the first reception mode, and a second reserved bit for enabling the second SPI to operate in one of the second transmission mode and the second reception mode;
a mode controller that sets a value of the first and second reserved bits based on at least one of the data-write command and the data-read command, thereby enabling the first and second SPIs to operate in one of the first transmission mode and the first reception mode, and one of the second transmission mode and the second reception mode, respectively; and
first and second resistors that act as fail-safe resistors for preventing an open circuit condition of the command and data channels.

13. The host device of claim 12, further comprising:
a host processor that provides at least one of the data-write command and the data-read command to the eMMC device by way of the first SPI, and receives the response to the at least one of the data-write command and the data-read command from the eMMC device, by way of the first SPI.

14. The host device of claim 13, further comprising:
a command memory that stores the at least one of the data-write command and the data-read command, and provides the response to the at least one of the data-write command and the data-read command;
a data memory that stores the at least one of the write-data and the read-data;
a command handler that receives the at least one of the data-write command and the data-read command, and the response to the at least one of the data-write command and the data-read command from the command memory, and provides the at least one of the data-write command and the data-read command, and the response to the at least one of the data-write command and the data-read command to the mode controller; and
a timer that generates a third interrupt signal to reset the mode controller, wherein when the mode controller does not receive a response to a command within a predetermined time limit, the timer times out and generates the third interrupt signal, thereby resetting the mode controller.

15. The host device of claim 13, further comprising:
a direct memory access (DMA) controller connected to the host processor for executing the at least one of a data-write operation and a data-read operation based on the at least one of the data-write command and the data-read command, respectively, wherein the DMA controller generates and transmits an interrupt signal to the host processor and the mode controller to indicate completion of the at least one of the data-read operation and the data-write operation.

16. The host device of claim 12, wherein:
the command output terminal SPI1_MOSI is active and the response input terminal SPI1_MISO is inactive when the first SPI is in the first transmission mode, and
the command output terminal SPI1_MOSI is inactive and the response input terminal SPI1_MISO is active when the first SPI is in the first reception mode.

17. The host device of claim 12, wherein:
the data output terminal SPI2_MISO is active and the data input terminal SPI2_MOSI is inactive when the second SPI is in the second transmission mode, and
the data output terminal SPI2_MISO is inactive and the data input terminal SPI2_MOSI is active when the second SPI is in the second reception mode.

18. The host device of claim 12, wherein the second SPI generates and transmits a clock signal to the first SPI and the eMMC device for synchronizing the data-read and data-write operations.

19. The host device of claim 12, wherein the first SPI generates and transmits a clock signal to the second SPI and the eMMC device for synchronizing the data-read and data-write operations.

20. An integrated circuit, comprising:
a host device comprising a first serial peripheral interface (SPI) having a command output terminal SPI1_MOSI and a response input terminal SPI1_MISO, and a second SPI having a data output terminal SPI2_MISO and a data input terminal SPI2_MOSI, a first clock terminal SPI1_CLK, and a first chip-select terminal SPI1_CS; and
an embedded multimedia card (eMMC) device connected to the host device, wherein the eMMC device includes (i) a memory array for storing data received from the host device; (ii) a first terminal connected to the command output terminal SPI1_MOSI of the first SPI for receiving data-read and data-write commands from the host device, and for transmitting a response to the host device, and (iii) a second terminal connected to the data input terminal SPI2_MOSI and data output terminal SPI2_MISO of the second SPI, wherein the eMMC device transmits read-data read from the memory array to the host device in response to a data-read command, and the host device transmits write-data to the eMMC for storing in the memory array in response to a write-data command, wherein the first SPI is operable in first transmission and first reception modes, and the second SPI is operable in second transmission and second reception modes, and wherein the host device further comprises a mode controller that causes the first SPI to operate in one of the first transmission and first reception modes, and the second SPI to operate in one of the second transmission and second reception modes, based on the data-read and data-write commands, and wherein the host device further comprises first and second resistors that act as fail-safe resistors for preventing an open circuit condition of the command and data channels.

21. The host device of claim 1, wherein:

the first chip-select terminal SPI1_CS is connected to the second chip-select terminal SPI2_CS, the first SPI generates a chip-select signal CSS that is transmitted from the first chip-select terminal SPI1_CS to the second chip-select terminal SPI2_CS, thereby enabling the first SPI to operate as a master SPI, the second SPI, which receives the chip-select signal CSS, serves as a slave SPI, and when the chip-select signal CSS is active, the second SPI is enabled, and when the chip-select signal CSS is inactive, the second SPI is disabled.

22. The host device of claim 1, wherein:

the first clock terminal SPI1_CLK is connected to the second clock terminal SPI2_CLK for synchronizing command and data transfer performed by the host device, when the first SPI is the master SPI, the first SPI generates and provides a clock signal CS to the second SPI that is serving as the slave SPI, and the first clock terminal SPI1_CLK provides the clock signal CS to the second clock terminal SPI2_CLK, and the first clock terminal SPI1_CLK is further connected to the eMMC clock terminal CLK of the eMMC device controller by way of a clock channel.

23. The host device of claim 3, wherein:

the command memory comprises a first shift register that transmits each command to the first SPI in a serial format;

the data memory comprises a second shift register that transmits write-data to the second SPI in a serial format; and the command handler comprises one of a set of instructions stored in the main memory of the host device, and a dedicated hardware circuit embedded within the host device.

* * * * *